United States Patent [19]

Dotrong et al.

[11] Patent Number: 5,194,519
[45] Date of Patent: Mar. 16, 1993

[54] RIGID-ROD GRAFT POLYMERS AND COPOLYMERS

[75] Inventors: My Dotrong; Robert C. Evers; George J. Moore, all of Dayton, Ohio

[73] Assignee: The United States of America as represented by the Secretary of the Air Force, Washington, D.C.

[21] Appl. No.: 802,928

[22] Filed: Dec. 6, 1991

[51] Int. Cl.⁵ .................. C08L 77/00; C08L 77/06
[52] U.S. Cl. .................. 525/434; 525/420; 525/435
[58] Field of Search .................. 525/434, 435, 420

[56] References Cited

U.S. PATENT DOCUMENTS

| | | | |
|---|---|---|---|
| 4,108,835 | 8/1978 | Arnold et al. | 528/183 |
| 4,835,246 | 5/1989 | Tsai et al. | 528/183 |
| 4,842,924 | 6/1989 | Farris et al. | 428/221 |
| 4,845,150 | 7/1989 | Kovak et al. | 525/434 |
| 5,128,443 | 7/1992 | Arnold et al. | 528/183 |

OTHER PUBLICATIONS

PCT WO89/07617 Maxdem Inc.

*Primary Examiner*—Morton Foelak
*Attorney, Agent, or Firm*—Charles E. Bricker; Donald J. Singer

[57] ABSTRACT

Fusible, rod-like, graft polymers and copolymers having repeating units of the formula:

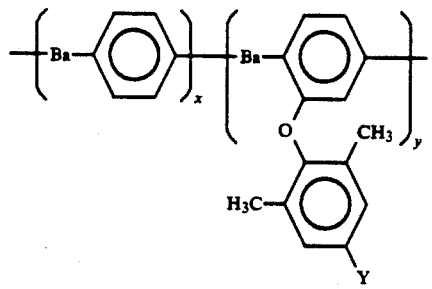

wherein x ranges from 0 to about 0.97, y is 1−x, Y is a poly(etherketone) (PEK) or a poly(etheretherketone) (PEEK), and wherein Ba is a benzobisimidazole or benzobisthiazole moiety are provided.

Also provided are methods for preparing the above polymers and copolymers, 2-(2,6-dimethylphenoxy)-terephthalic acid and a method for preparing the latter.

14 Claims, No Drawings

RIGID-ROD GRAFT POLYMERS AND COPOLYMERS

RIGHTS OF THE GOVERNMENT

The invention described herein may be manufactured and used by or for the Government of the United States for all governmental purposes without the payment of any royalty.

BACKGROUND OF THE INVENTION

This invention relates to para-ordered aromatic heterocyclic graft polymers and copolymers.

In general, the class of aromatic heterocyclic extended chain polymers are well known for their outstanding thermal, physical and chemical properties. Considerable research has been directed toward using poly(p-phenylene benzobisazole) polymers as the reinforcing elements in polymeric composites. These polymers, also known as rigid-rod polymers, have a high modulus and high strength, and can act as reinforcing elements similar to the reinforcement afforded by chopped fibers, but with the reinforcement taking place at the molecular level. Unfortunately, these polymers are essentially non-melting and have proven difficult to economically process into articles. In order to fashion such polymers into articles of commerce, for example, fibers, films, fibrids, and the like, it is necessary that they be in solution or dope form. Although such polymers can be dissolved in various acidic solvents, such as sulfuric acid (SA), methanesulfonic acid (MSA), chlorosulfonic acid (CSA), polyphosphoric acid (PPA), and the like, difficulty is often experienced in preparing and using the polymer-acid compositions or dopes because of poor polymer-acid solubility.

Normally, a precipitated or dried particulate form of the polymer is dissolved in a strong acidic solvent by mixing the polymer particles at elevated temperature for a period of several hours to several days. The resulting dopes often contain undissolved polymer and must be filtered before further processing into articles.

Considerable research has been directed toward using poly(p-phenylene benzobisazole) polymers as the reinforcing elements in polymeric composites. These polymers, also known as rigid-rod polymers, have a high modulus and high strength, and can act as reinforcing elements similar to the reinforcement afforded by chopped fibers, but with the reinforcement taking place at the molecular level.

Development of these polymers for applications requiring bulk forms has been hindered by the difficult processibility of these polymers due to their limited solubility and complete infusibility. Previous attempts to improve polymer solubility or fusibility through modification of the polymer structures such as by the inclusion of diphenoxybenzene "swivels" or points of articulation to form articulated rod-like polymers have not been satisfactory. Processing difficulties have been somewhat circumvented by novel processing concepts and approaches such as molecular composites in which the rod-like polymer is uniformly dispersed at the molecular level in a fusible, malleable host or matrix. Implementation of this concept has previously entailed novel synthetic approaches, including the preparation of poly(p-phenylenebenzobisimidazole) structures with polypropylene side-chains. Although these copolymers could be readily processed neat at moderate temperatures and pressures to give consolidated bulk forms with good mechanical properties, they exhibited limited thermooxidative stability.

Accordingly, it is an object of the present invention to provide rigid-rod heterocyclic polymers which are fusible.

Other objects and advantages of the present invention will be apparent to those skilled in the art from a reading of the following detailed description of the invention.

SUMMARY OF THE INVENTION

In accordance with the present invention, there are provided fusible, rod-like, graft polymers and copolymers having repeating units of the formula:

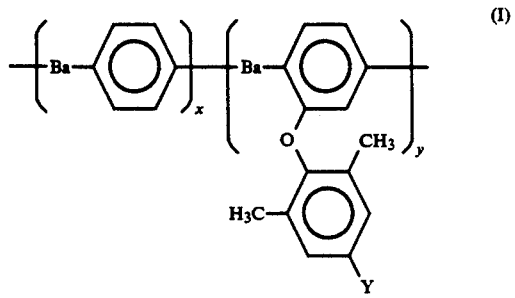

wherein x ranges from 0 to about 0.97, y is 1−x, Y is a poly(etherketone) (PEK) or a poly(etheretherketone) (PEEK), wherein the poly(etherketone) has repeating units of the formula:

wherein Q is a divalent phenylene or substituted phenylene moiety and a is an integer having a value of 1 to 4, and the poly(etheretherketone) has repeating units of the formula:

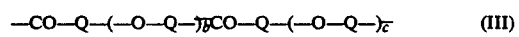

wherein Q is as described above, b is an integer having a value of 1 to 4 and c is an integer having a value of 2 to 5; and wherein Ba is

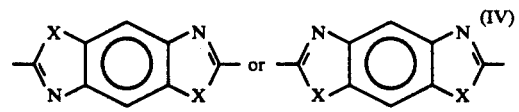

wherein X is —S— or —NH—.

The graft polymers and copolymers of the present invention are prepared by grafting a poly(etherketone) or a poly(etheretherketone) onto a poly(p-phenylenebenzobisthiazole) (PBT) or poly(p-phenylenebisimidazole) (PBI) structure comprising a pendant 2,6-dimethylphenoxy graft site. The polymers comprising this graft site are prepared by the polycondensation in polyphosphoric acid (PPA) of 2-(2,6-dimethylphenoxy) terephthalic acid or 2-(2,6-dimethylphenoxy) terephthaloyl chloride with 2,5-diamino-1,4-benzenedithiol dihydrochloride, 1,3-diamino-4,6-benzenedithiol dihydrochloride, or 1,3,4,6-tetraaminobenzene tetrahydrochloride following established procedures. The copolymers comprising this graft site are prepared by the polycondensation the above named monomers with the further addition of a para-oriented aromatic dicarboxylic acid or acid halide, such as, for example, terephthalic acid or terephthaloyl chloride.

The monomer comprising the 2,6-dimethylphenoxy graft site may be prepared as shown by the following reaction sequence:

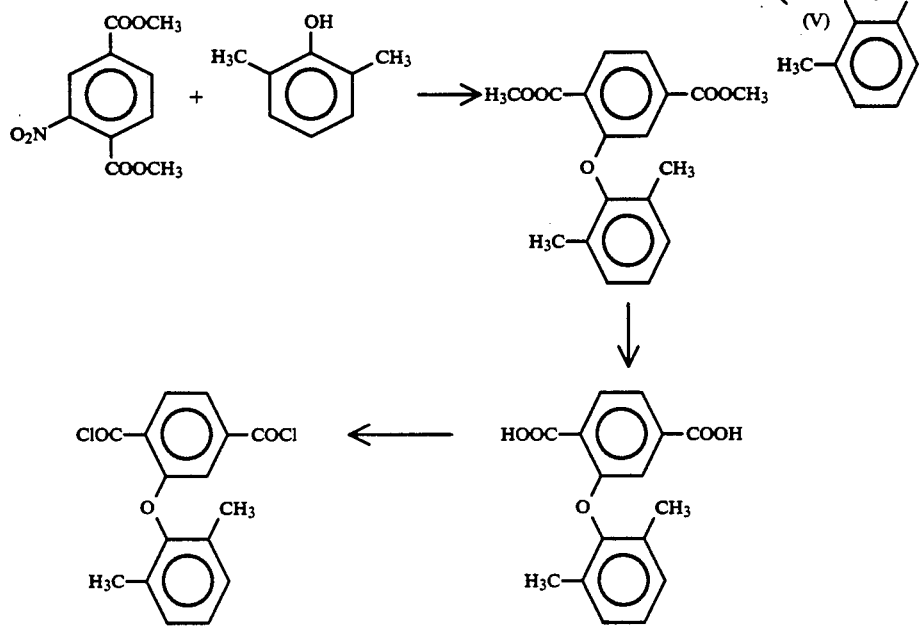

The first step in preparing the desired monomer is a nitro-displacement of 2,6-dimethylphenol with dimethyl-2-nitroterephthalate in a suitable solvent, such as, for example, N,N-dimethylformamide (DMF). The resulting dimethyl-2-(2,6-dimethylphenoxy) terephthalate is then saponified with, for example, sodium hydroxide, to yield the free diacid, which can then be converted to the diacid halide by treatment with, for example, thionyl chloride.

The poly(p-phenylenebenzobisthiazole) (PBT) or poly(p-phenylenebisimidazole) (PBI) structure comprising a pendant 2,6-dimethylphenoxy graft site is prepared as shown by the following reaction sequence:

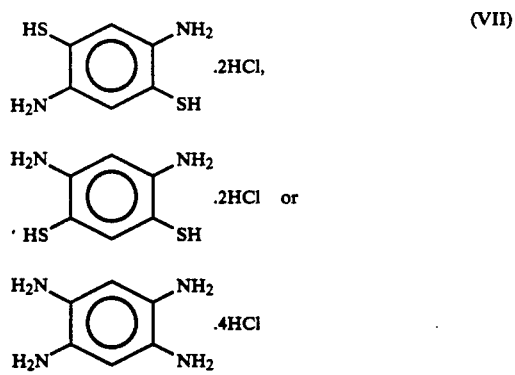

wherein Ba, x and y are as described previously and bA is one of:

(VII)

$$HS \overset{NH_2}{\underset{SH}{\bigodot}} H_2N \quad .2HCl,$$

$$H_2N \overset{NH_2}{\underset{SH}{\bigodot}} HS \quad .2HCl \text{ or}$$

$$H_2N \overset{NH_2}{\underset{NH_2}{\bigodot}} H_2N \quad .4HCl$$

The polycondensation shown above is carried out using techniques known in the art.

Lower molecular weight PBT/PBI polymers/copolymers leading to more readily processible graft copolymers can be prepared by adjusting the stoichiometry of the polycondensation reactions in favor of the hydrochloride salt. The relatively low molecular weight polymers/copolymers can then be endcapped with a suitable endcapper, such as 2,4,6-trimethylbenzoic acid, to prevent any undesirable side-reactions during subsequent grafting operations, as shown by the following reaction sequence:

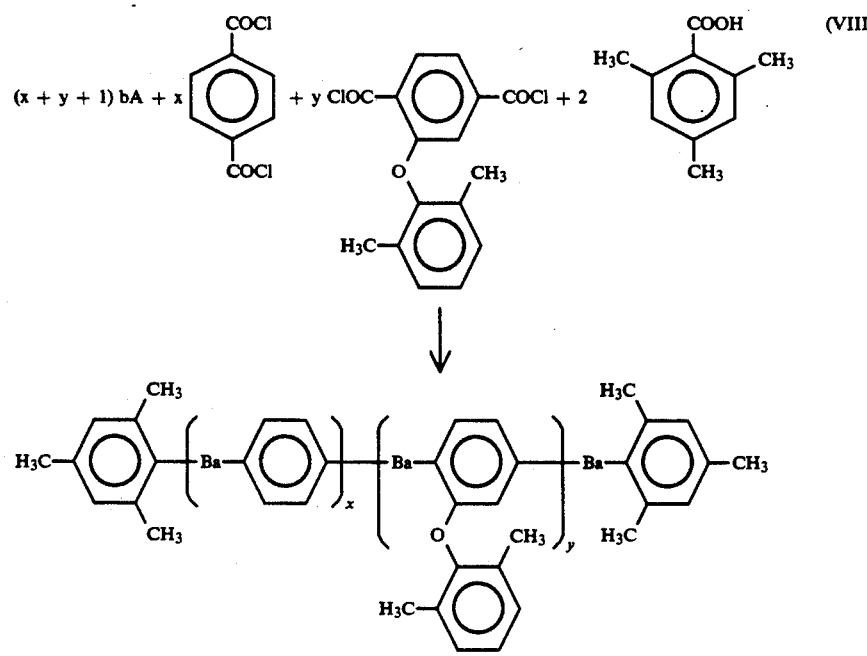

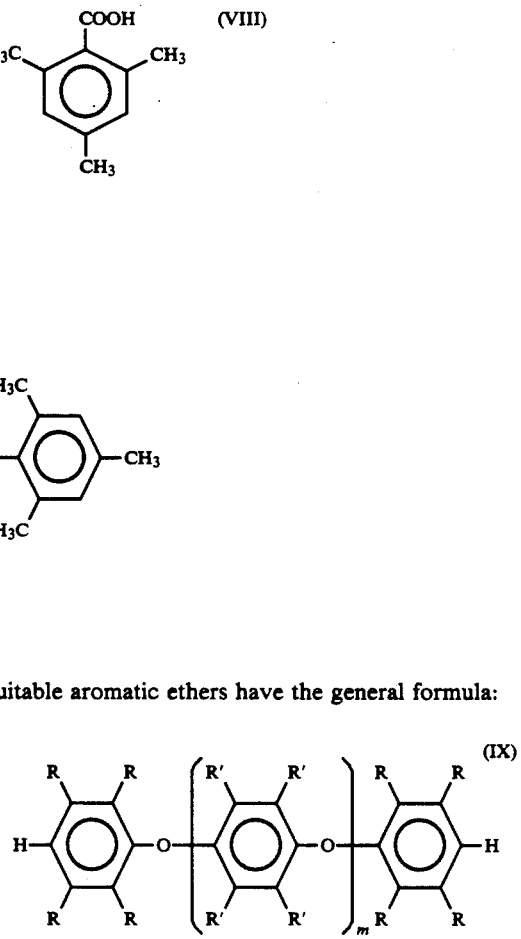

wherein bA, x and y are as described previously.

The graft copolymers of this invention are prepared by grafting a poly(etherketone) or a poly(etheretherketone) onto a poly(p-phenylenebenzo bisthiazole) (PBT) or poly(p-phenylenebenzobisimidazole) (PBI) structure comprising a pendant 2,6-dimethylphenoxy graft site. In carrying out the process, the PBT or PBI is dissolved in a mixture of methanesulfonic acid (MSA) and phosphorus pentoxide ($P_2O_5$). In general, the quantity of rigid-rod polymer/copolymer is about 1 to 5 weight percent, based upon the weight of MSA, and the quantity of $P_2O_5$ is about 10 weight percent, also based upon the weight of MSA.

After a solution of the PBT or PBI in MSA/$P_2O_5$ is obtained, the grafting monomer(s) is(are) added. To prepare the poly(etherketone) (PEK) graft copolymer, a phenoxybenzoic acid is added to the reaction mixture. In general, the quantity of the graft monomer is about 1 to 10 moles per mole of the rigid-rod copolymer. Since the y portion of the PBT/PBI molecule can be varied, the quantity of the graft monomer expressed in terms of the y portion of the molecule can range from about 4 to 300 moles per mole of the y portion.

Suitable phenoxybenzoic acids include 3-phenoxybenzoic acid, 4-phenoxybenzoic acid, (4'-phenoxy)-3-phenoxybenzoic acid, (4'-phenoxy)-4-phenoxybenzoic acid, (2'-phenyl)-4-phenoxybenzoic acid, and (4'-methoxy)-4-phenoxybenzoic acid.

To prepare the poly(etheretherketone) (PEEK) graft copolymer, an aromatic ether and an aromatic ether dibenzoic acid are added to the reaction mixture. In general, the quantity of the graft monomers is about 1 to 5 moles per mole of PBT or PBI. However, because these monomers are very reactive, the quantity of monomers is preferably maintained below about 3.5 mole percent to minimize crosslinking during the preparation. The above quantities comprise the combined quantity of aromatic ether and oxydibenzoic acid, these compounds being employed in substantially equimolar quantities.

Suitable aromatic ethers have the general formula:

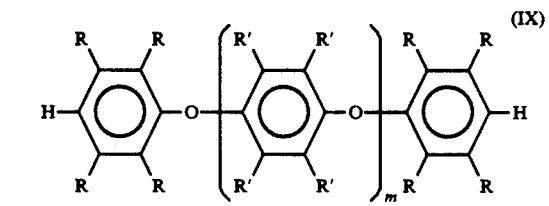

wherein m is 0 to 2, wherein R is -H, alkyl having 1 to 6 carbon atoms, alkoxy having 1 to 6 carbon atoms, or phenyl, and wherein R' is R, halogen, aliphatic acyl having 2 to 5 carbon atoms or aromatic acyl having 7 to 9 carbon atoms. Examples of suitable aromatic ethers include 1,4-diphenoxybenzene, diphenyl ether, diphenoxyphenylether and the like.

Suitable dibenzoic acids have the general formula:

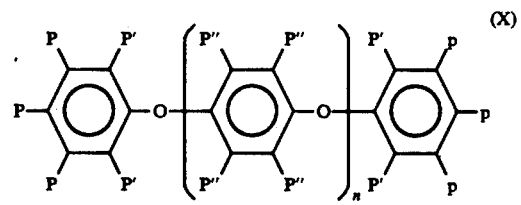

wherein n is 0 to 2, wherein one each of P and p are —COOH or —COCl in the m-or p- position, wherein the remaining P and p are —H, halogen, alkyl having 1 to 6 carbon atoms, alkoxy having 1 to 6 carbon atoms, or phenyl, wherein P' is —H, halogen, alkyl having 1 to 6 carbon atoms, alkoxy having 1 to 6 carbon atoms, or phenyl, and wherein P" is —H, alkyl having 1 to 6 carbon atoms, alkoxy having 1 to 6 carbon atoms, or aromatic having 6 to 9 carbon atoms. Examples of suitable dibenzoic acids include 4,4'-oxydibenzoic acid, 3,4'-oxydibenzoic acid, 4,4'-(p-phenylenedioxy)dibenzoic acid, and 3,3'-(p-phenylenedioxy)dibenzoic acid, including their acid halides, and the like.

After adding the graft monomer(s), the mixture is stirred at about room temperature for about 2 to 48 hours or until a clear homogeneous solution is obtained. The reaction mixture is then raised to about 130° C., and held at that temperature, with stirring, for about 8 to 96 hours.

Recovery of the graft copolymer from the reaction solution may be accomplished by precipitating the copolymer in a liquid, such as water or tetrahydrofuran, which is a non-solvent for the (co)polymer, followed by filtration and drying.

Thus, in accordance with the present invention, graft copolymers of rod-like polybenzthiazole and polybenzimidazole can be synthesized through the stepwise grafting of flexible poly(etherketone) and/or poly(etheretherketone) sidechains onto the rod-like structures using the 2,6-dimethylphenoxy "swivel" structures within the polymer backbone as the graft sites. The composition of the resulting thermooxidatively stable copolymers can be controlled through the number of graft sites within the polymer backbone as well as by the quantity of side-chain monomers charged into the grafting reaction, the latter being carried out completely in solution in a homogenous MSA/$P_2O_5$ reaction medium. Incorporation of the flexible sidechains into the rigid-rod molecule has a beneficial effect on polymer solubility and fusibility while incurring little sacrifice in polymer thermooxidative stability. The graft copolymers exhibit sufficient fusibility to permit consolidation of the neat materials into useful bulk forms which exhibit good mechanical properties as well as high thermooxidative and chemical stability. The graft copolymers of this invention thus effectively function as a one-part molecular composite in which the rigid-rod backbone and fusible host are contained within a single polymer molecule. Because of their superior thermooxidative stability, mechanical properties and processibility, these graft copolymers may be used to replace fiber-reinforced epoxy composites in a variety of applications.

The following examples illustrate the invention. In the examples, inherent viscosity was determined in MSA at 30° C.

EXAMPLE I

Synthesis of 2-(2,6-Dimethylphenoxy)terephthaloyl Chloride

Dimethyl-2-(2,6-dimethylphenoxy)terephthalate 90.6 g of potassium t-butoxide (0.80 mole) was added to a stirred solution of 97.6 g of 2,6-dimethylphenol (0.80 mole) in 320 ml of dry toluene and 800 ml of dry N,N-dimethylformamide (DMF) under a nitrogen atmosphere. The reaction mixture was heated until a volume of 300 ml of toluene was removed by distillation, and was then cooled to room temperature. 191.2 g of 2-nitrodimethylterephthalate (0.80 mole) was added and the reaction stirred at 100° C. overnight. After the reaction mixture was allowed to cool to room temperature, approximately 600 ml of DMF was removed on an evaporator at 80° C./50 mm. The remaining mixture was chilled and poured with stirring into ice water. Following several extractions with ethyl acetate, the combined extracts were washed with saturated NaCl solution and dried over anhydrous sodium sulfate. Removal of solvent from the dried solution yielded 88.4 g of dark brown liquid. Distillation of the brown material using a short path apparatus at 150°-153° C./0.1 mm yielded a yellowish solid. Recrystallization from hit ethanol followed by recrystallization from hexane gave 58 g (28% yield) of white solid (mp 82°-84° C.).

Elemental analysis: Calculated for $C_{18}H_{18}O_5$: C, 68.78; H, 5.77. Found: C, 68.65; H, 5.79.

$^1$H-NMR (CDCl$_3$): 2.16 ppm (S, CH$_3$), 3.90 ppm (S, COOCH$_3$); 4.03 ppm (S, COOCH$_3$); 7.21 ppm-8.10 ppm (M, aromatic H).

IR (KBr): 1734 cm$^{-1}$; 1727 cm$^{-1}$ (C=O); 1288 cm$^{-1}$ ($\phi$-O-$\phi$).

MS (EI): 314 m/e (M+).

2-(2,6-Dimethylphenoxy)terephthalic Acid:

To a stirred solution of 17 g (0.425 mole) of NaOH in 25 ml of water were added 26.79 g (0.085 mole) of dimethyl-2-(2,6-dimethylphenoxy)terephthalate and 50 ml of ethanol. The reaction mixture was heated and refluxed overnight. After cooling to room temperature, the reaction mixture was poured into stirred ice water. The mixture was acidified with conc. HCl to precipitate a white product which was collected on a filter and suction dried to yield 24.45 g of white solid. Recrystallization from ethanol-water (3:1) yielded 22.6 g (93%) of white crystals (mp 315°-317° C.).

Elemental analysis: Calculated for $C_{16}H_{14}O_5$: C, 67.12; H, 4.93. Found: C, 67.11; H, 5.05.

$^1$H-NMR (d$^6$ acetone): 2.16 ppm (S, CH$_3$), 7.20 ppm-8.20 ppm (M, aromatic H).

IR (KBr): 3057 cm$^{-1}$ (OH); 1697 cm$^{-1}$ (C=O); 1289 cm$^{-1}$ ($\phi$-O-$\phi$).

MS (EI): 286 m/e (M+).

2-(2,6-Dimethylphenoxy)terephthaloyl Chloride:

20.0 g (0.069 mole) of 2-(2,6-dimethylphenoxy)-terephthalic acid, 100 ml of thionyl chloride and a few drops of DMF were stirred at reflux overnight. The excess thionyl chloride was removed by distillation, and 100 ml of toluene added and distilled to remove residual thionyl chloride. The remaining yellow material was distilled at 140°-143° C./0.07 mm and the resultant solid was crystallized twice from hexane to yield 14.7 g (65% yield) of white crystals, mp 65°-67° C.

Elemental analysis: Calculated for $C_{16}H_{12}O_3Cl_2$: C, 59.46; H, 3.74; Cl, 21.94. Found: C, 59.70; H, 3.91; Cl, 21.69.

$^1$H-NMR (CDCl$_3$): 2.10 ppm (S, CH$_3$), 7.20 ppm-8.30 ppm (M, aromatic H).

IR (KBr): 1776 cm$^{-1}$; 1758 cm$^{-1}$ (COCl).

MS (EI): 323 m/e (M+).

EXAMPLE II

Synthesis of PBT Polymer 1.9586 g (7.988 mmol) of 2,5-diamino-1,4-benzenedithiol dihydrochloride and 2.5816 g (7.988 mmol) of 2-(2,6-dimethylphenoxy)terephthaloyl chloride were stirred in 19.28 g of 77% PPA under a stream of nitrogen at room temperature for one hour. The temperature was raised slowly to 40° C. for 2 hours, 60° C. for 18 hours, then 100° C. for 2 hours. After dehydrochlorination was complete, the yellow solution was cooled to room temperature and 8.45 g of $P_2O_5$ was added to make the final $P_2O_5$ content of the PPA 83.0%. The mixture was heated to 100° C. for 3 hours, then temperature was rapidly raised to 165° C. The homogeneous mixture became dark red. Stir opalescence appeared after 3 hours. The mixture was stirred at 165° C. for 24 hours. The extremely viscous mixture was then poured into water to precipitate the polymer. The precipitated polymer was stirred in a blender until it was broken up into a fine, fibrous form. It was washed with dilute NH4OH and extracted with water in a continuous extraction apparatus for 24 hours. The polymer was then dried in vacuo at 100° C. for 24 hours. 3.07 g (98% yield) of an orange-red fibrous polymer was obtained. An intrinsic viscosity of 12.0 dl/g in MSA at 30° C. was recorded.

Elemental analysis: Calculated for $C_{22}H_{12}S_2N_2O$: C, 68.72; H, 3.74; N, 7.28. Found: C, 67.25; H, 3.75; N, 7.24.

EXAMPLE III

Synthesis of PBT Copolymer

In a procedure similar to the procedure given in Example II, 4.9038 g (20 mmol) of 2,5-diamino-1,4-benzenedithiol dihydrochloride, 0.6463 g (2 mmol) of 2-(2,6-dimethylphenoxy)terephthaloyl chloride and 3.6564 g (18 mmol) of terephthaloyl chloride were copolymerized in 85% PPA. 15.5 g (99% yield) of an orange fibrous copolymer with an intrinsic viscosity of 44.0 dl/g in MSA at 30° C. was obtained.

Elemental Analysis: Calc'd for $(C_{14}H_6N_2S_2)_9(C_{22}H_{14}N_2S_2O)$: C, 63.85; H, 2.46; N, 10.06; S, 23.04. Found: C, 63.01; H, 2.42; N, 8.91; S, 21.31.

EXAMPLE IV

Synthesis of Endcapped PBT Copolymer

In a procedure similar to the procedure given in Example II, 3.9878 g (16.264 mmol) of 2,5-diamino-1,4-benzenedithiol dihydrochloride, 1.5234 g (4.714 mmol) of 2-(2,6-dimethylphenoxy)terephthaloyl chloride, 2.2332 g (11 mmol) of terephthaloyl chloride and 0.157 g (0.9566 mmol) of 1,4,6-trimethylbenzoic acid were copolymerized in PPA. 4.77 g (100% yield) of an orange fibrous copolymer with an intrinsic viscosity of 3.50 dl/g in MSA at 30° C. was obtained.

Elemental Analysis: Calc'd for $(C_{14}H_6N_2S_2)_7(C_{22}H_{14}N_2S_2O)_3$: C, 65.14; H, 2.80; N, 9.27; S, 21.20. Found: C, 64.78; H, 2.96; N, 9.34; S, 21.38.

EXAMPLE V

A series of polymers/copolymers was prepared following the procedure given in Example II. A summary of these polymers, together with the polymers prepared in Examples II–IV, is given in Table I, below. The items x and y are as defined previously.

TABLE I

| Pmr | Example | End Capped | x | y | Polymer conc. % (w/w) | Inh. Visc. dl/g |
|---|---|---|---|---|---|---|
| 1 | III | No | 0.9 | 0.1 | 10 | 44.0 |
| 2 | | No | 0.9 | 0.1 | 12 | 38.8 |
| 3 | | No | 0.9 | 0.1 | 15 | 23.6 |
| 4 | | No | 0.8 | 0.2 | 10 | 34.6 |
| 5 | | No | 0.5 | 0.5 | 10 | 16.3 |
| 6 | II | No | 0.0 | 1.0 | 10 | 12.0 |
| 7 | | Yes | 0.9 | 0.1 | 10 | 4.6 |
| 8 | IV | Yes | 0.7 | 0.3 | 10 | 3.5 |
| 9 | | Yes | 0.3 | 0.7 | 10 | 3.5 |

The above data illustrate that concentration of graft sites and intrinsic viscosities of the resulting (co)polymers can be varied through control of the stoichiometry of the reaction and concentration of the reaction mixture.

EXAMPLE VI

The feasibility of the grafting reaction and the reactivity of the para position of the pendant 2,6-dimethylphenoxy group was demonstrated by the following reaction:

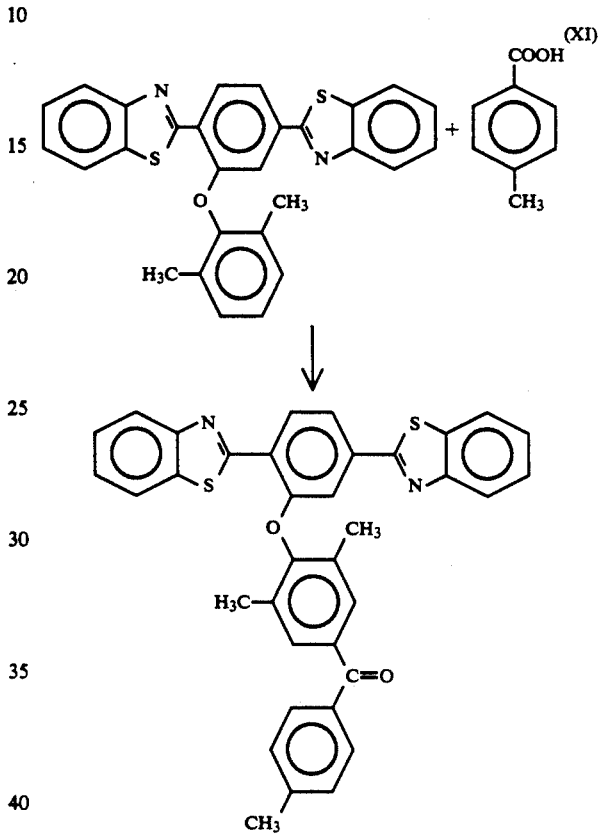

Synthesis of 1,4-Bis(2-benzothiazole)-2-(2,6-dimethylphenoxy)benzene 1.0 g (3.094 mmol) of 2-(2,6-dimethylphenoxy)terephthaloyl chloride and 0.923 g (7.425 mmol) of o-aminothiophenol were stirred under $N_2$ in 15 g of 87% PPA at 165° C. for 24 hours. The homogeneous yellow solution was poured into ice water and the precipitated yellow crude product was isolated by filtration. Following air drying, recrystallization from toluene (charcoal) gave 1.35 g (95% yield) of white crystalline product (mp 252° C.).

Elemental analysis calc'd for $C_{28}H_{20}N_2S_2O$: C, 72.38; H, 4.33; N, 6.00; S, 12.80. Found: C, 72.41; H, 4.54; N, 5.98; S, 13.28.

$^1$H-NMR (CDCl$_3$): 2.24 ppm (S, CH$_3$); 7.23 ppm–8.82 ppm (aromatic H).

$^{13}$C-NMR (CDCl$_3$): 166.5 ppm; 161.8 ppm; 155.6 ppm; 154.4 ppm; 150 ppm; 136.7 ppm; 136.5 ppm; 135.3 ppm; 131.3 ppm; 130.5 ppm; 129.5 ppm; 126.4 ppm; 126.2 ppm; 126.0 ppm; 125.5 ppm; 125.0 ppm; 123.9 ppm; 123.5 ppm; 123.1 ppm; 121.6 ppm; 121.3 ppm; 121.1 ppm; 111.7 ppm; 16.4 ppm.

Ms (EI): 464 m/e (M+).

Synthesis of 1,4-bis(2-benzothiazyl)-2-[4-(p-methylbenzoyl)-2,6-dimethylphenoxy]benzene 3.02 g (6.16 mmol) of 1,4-Bis(2-benzothiazol)-2-(2,6-dimethyl-phenoxy)benzene and 0.855 g (6.28 mmol) of p-toluic acid was stirred in a solution of 2.7 g $P_2O_5$ and 27 g MSA under a $N_2$ atmosphere at 120° C. for 48 hours. The resultant dark red solution was poured into ice water and the precipitated crude product was collected by filtration (yield 3.6 g). After recrystallization from toluene/hexane, 3.1 g of white crystalline product was obtained (86% yield).

Elem. Anal. Calc'd for $C_{36}H_{26}N_2S_2O_2$: C, 74.19; H, 4.49; N, 4.80; S, 11.00. Found: C, 73.60; H, 4.61; N, 4.66; S, 11.23.

$^1$H-NMR ($C_6D_6$): 1.03 ppm (S, $CH_3$); 1.16 ppm (S, $CH_3$); 1.33 ppm (S, $CH_3$); 5.9 ppm–8.2 ppm (aromatic H).

IR (KBr): 1658 cm$^{-1}$ (C=O).

MS (EI): 582 m/e (M+).

EXAMPLE VII

Synthesis of PEK-g-PBT 2.50 g of an endcapped PBT polymer with 30 mole % graft sites ($\eta = 4.6$ dl/g in MSA at 30° C.) were stirred under nitrogen a room temperature in a solution of $P_2O_5$ (11 g) and MSA (110 g) until a clear golden yellow solution was obtained. 9.5 g of 3-phenoxybenzoic acid was added to the solution which was stirred until it became homogeneous. The reaction temperature was then slowly raised to 120° C. After 24 hours, the resulting dark red, very viscous solution was poured into water to precipitate the graft copolymer. The precipitated polymer was isolated by filtration, washed with dilute $NH_4OH$ and then with water. The polymer was extracted with water in a continuous extraction apparatus for 24 hours to remove any acid residue. After drying in vacuo at 100° C. the graft copolymer was extracted with methylene chloride in a continuous extraction apparatus for 24 hours to remove any residual unattached poly(etherketone). The resulting dark brown product was dried at 100° C./1 mm Hg to give 7.68 g of graft copolymer ($\eta = 3.5$ dl/g in MSA at 30° C.). From the methylene chloride extracts, 3.52 g of unattached poly(etherketone) were obtained ($\eta = 0.1$).

Elemental Analysis Calc'd for $(C_{14}H_6N_2S_2)_7(C_{22}H_{14}N_2S_2O)_3(C_{13}H_8O_2)_{32.7}$: Calc'd: C, 74.98; H, 3.69; N, 2.92; S, 6.79. Found: C, 67.80; H, 3.54; N, 2.79; S, 9.36.

EXAMPLE VIII

A series of PBT-g-PEK copolymers was prepared following the procedure given in Example VII. In Trial Nos. 1–4, an endcapped PBT copolymer was used. The final graft copolymer concentration was 10% (w/w). Trial No. 3 presents the results for the copolymer prepared in Example VII, above. In Trial No. 5, a non-endcapped PBT copolymer was used. The final graft copolymer concentration was 3.6% (w/w) The results are summarized in Table II, below.

TABLE II

| Trial No. | Graft Site mole % | Int. Visc. PBT (dl/g) | Int. Visc. PBT-g-PEK (dl/g) | Rod/Coil % (w/w) |
|---|---|---|---|---|
| 1 | 10 | 4.6 | 3.2 | 52/48 |
| 2 | 10 | 8.6 | 3.2 | 46/54 |
| 3 | 30 | 4.6 | 3.5 | 32/68 |
| 4 | 30 | 4.6 | 3.8 | 42/58 |
| 5 | 10 | 38.8 | 14.0 | 45/55 |

The graft copolymers were obtained as fibrous, dark brown materials. The successful incorporation of the PEK from 3-phenoxybenzoic acid into the rigid-rod structure was substantiated by infrared spectroscopy. In all cases, a band at 1650 cm$^{-1}$, attributable to aromatic ketone, was observed as well as a substantially increased absorption at 1250$^{-1}$, attributable to aromatic ether structure. Further evidence of the successful grafting reaction was given by comparison of the dilute solution viscosity plots, wide-angle x-ray photographs and scanning electron microscope photographs of the PBT-g-PEK copolymer with identically constituted mechanical mixtures of PBT copolymer with PEK.

The solubility of the PBT copolymer was modified by the grafting procedure. While the PBT copolymers were soluble only in MSA and PPA, the graft copolymer also exhibited solubility in trifluoroacetic acid.

Thermooxidative stability of the PBT-g-PEK copolymer was quite high although a slight penalty in stability was incurred through the incorporation of the PEK side-chains into the very stable PBT copolymers. Under thermogravimetric analysis in air, substantial breakdown of the PBT-g-PEK copolymer did not occur until the 430°–450° C. range.

Differential scanning colorimetry generally did not indicate any softening of the PBT-g-PEK at higher temperatures. These graft copolymers could be processed into strong molded samples through the application of elevated temperature and pressure, e.g., 450° C. and 3000 psi for one hour. Tensile modulii and strengths of approximately 1.2 Msi and 4.9 Ksi, respectively, were obtained for a sample with an approximately 50% rigid-rod backbone content.

Various modifications may be made to the invention as described without departing from the spirit of the invention or the scope of the appended claims.

We claim:

1. A method for preparing 2-(2,6-dimethylphenoxy)-terephthalic acid which comprises reacting 2,6-dimethylphenol with potassium t-butoxide in a suitable solvent, reacting the resulting intermediate with 2-nitrodimethylterephthalate and recovering said 2-(2,6-dimethylphenoxy)terephthalic acid.

2. A fusible, rod-like, graft copolymer having repeating units of the formula:

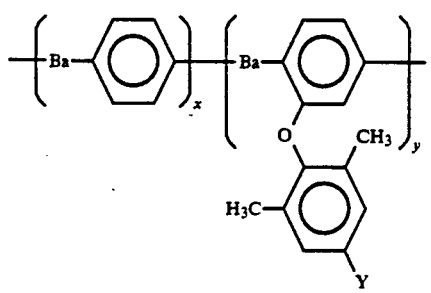

wherein x ranges from 0 to about 0.97, y is 1−x, Y is a poly(etherketone) (PEK) or a poly(etheretherketone) (PEEK), wherein the poly(etherketone) has repeating units of the formula:

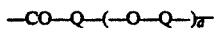

wherein Q is a divalent phenylene or substituted phenylene moiety and a is an integer having a value of 1 to 4, and the poly(etheretherketone) has repeating units of the formula:

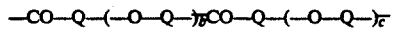

wherein Q is as described above, b is an integer having a value of 1 to 4 and c is an integer having a value of 2 to 5; and wherein Ba is

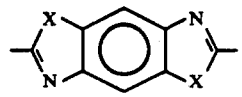

or

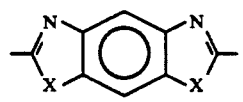

wherein X is —S— or —NH—.

3. The copolymer of claim 2 wherein Y is PEK.
4. The copolymer of claim 3 wherein X is —S—.
5. The copolymer of claim 4 wherein y is 0.3.
6. The copolymer of claim 4 wherein y is 0.1.
7. The copolymer of claim 3 wherein X is —NH—.
8. The copolymer of claim 2 wherein Y is PEEK.
9. The copolymer of claim 8 wherein X is —S—.
10. The copolymer of claim 8 wherein X is —NH—.
11. A method for preparing a fusible, rod-like, graft copolymer having repeating units of the formula:

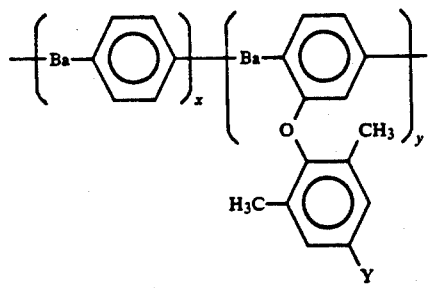

wherein x ranges from 0 to about 0.97, y is 1−x, Y is a poly(etherketone) (PEK) having repeating units of the formula:

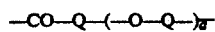

wherein Q is a divalent phenylene or substituted phenylene moiety and a is an integer having a value of 1 to 4, and wherein Ba is

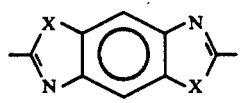

or

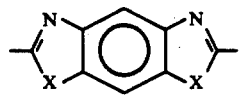

wherein X is —S— or —NH—, which comprises the steps of reacting 2-(2,6-dimethylphenoxy)terephthalic acid or its acid halide with an aminobenzene of the formula

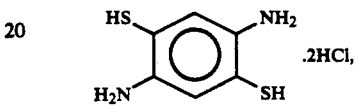

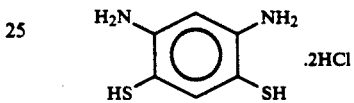

or

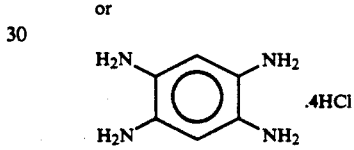

in polyphosphoric acid under reaction conditions to prepare the corresponding rigid-rod polybenzazole polymer, recovering said rigid-rod polymer, dissolving said rigid-rod polymer in a mixture of methanesulfonic acid and phosphorus pentoxide, reacting a phenoxybenzoic acid with said rigid-rod polymer under reaction conditions, and recovering the resulting graft copolymer.

12. The method of claim 11 wherein said X is —S—, y is 0.3 and said phenoxybenzoic acid is 3-phenoxybenzoic acid.

13. The method of claim 11 wherein said X is —S—, y is 0.1 and said phenoxybenzoic acid is 3-phenoxybenzoic acid.

14. A method for preparing a fusible, rod-like, graft copolymer having repeating units of the formula:

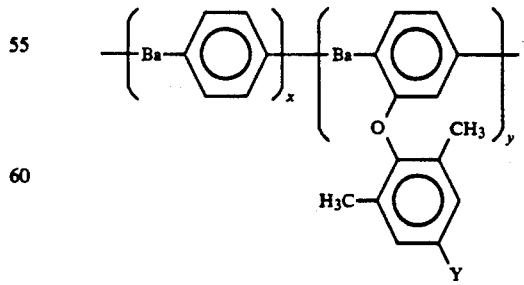

wherein x ranges from 0 to about 0.97, y is 1−x, Y is a poly(etheretherketone) (PEEK) having repeating units of the formula:

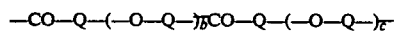

wherein Q is a divalent phenylene or substituted phenylene moiety, b has a value of 1 to 4 and c has a value of 2 to 5; and wherein Ba is

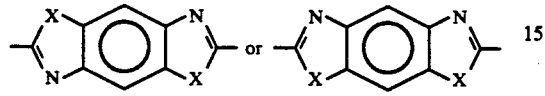

wherein X is —S— or —NH—, which comprises the steps of reacting 2-(2,6-dimethylphenoxy)terephthalic acid or its acid halide with an aminobenzene of the formula

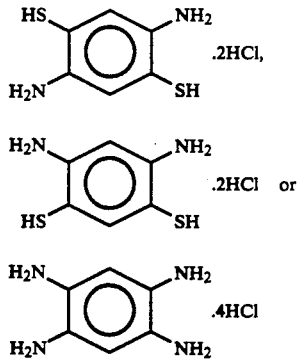

in polyphosphoric acid under reaction conditions to prepare the corresponding rigid-rod polybenzazole polymer, recovering said rigid-rod polymer, dissolving said rigid-rod polymer in a mixture of methanesulfonic acid and phosphorus pentoxide, reacting an aromatic ether and an aromatic ether dibenzoic acid with said rigid-rod polymer under reaction conditions, and recovering the resulting graft copolymer.

* * * * *